United States Patent [19]

Sugasawa et al.

[11] 4,274,373
[45] Jun. 23, 1981

[54] COMBINED SPLIT ENGINE AND CLOSED LOOP MIXTURE CONTROL OPERATION WITH ENRICHED FUEL DURING PARTIAL CYLINDER MODE

[75] Inventors: Fukashi Sugasawa, Yokohama; Haruhiko Iizuka; Junichiro Matsumoto, both of Yokosuka, all of Japan

[73] Assignee: Nissan Motor Company, Limited, Yokohama, Japan

[21] Appl. No.: 46,350

[22] Filed: Jun. 7, 1979

[30] Foreign Application Priority Data

Jun. 16, 1978 [JP] Japan .................. 53-72851

[51] Int. Cl.$^3$ .............................................. F01N 3/15
[52] U.S. Cl. .............................. 123/440; 123/198 F; 60/276; 60/285
[58] Field of Search ....... 123/32 EA, 119 EC, 198 F, 123/119 LR; 60/276, 285

[56] References Cited

U.S. PATENT DOCUMENTS

| | | | |
|---|---|---|---|
| 2,875,742 | 3/1959 | Dolza | 123/119 |
| 3,765,205 | 9/1973 | Frost | 123/32 EA |
| 3,765,394 | 10/1973 | Francis | 123/198 F |
| 4,000,614 | 1/1977 | Abthoff et al. | 60/276 |
| 4,134,261 | 1/1979 | Iizuka et al. | 60/277 |
| 4,143,635 | 3/1979 | Iizuka et al. | 123/198 F |
| 4,144,864 | 3/1979 | Kato et al. | 123/32 EA |
| 4,149,502 | 4/1979 | Johnson et al. | 123/119 EC |

*Primary Examiner*—Charles J. Myhre
*Assistant Examiner*—Raymond A. Nelli

*Attorney, Agent, or Firm*—Schwartz, Jeffery, Schwaab, Mack, Blumenthal & Koch

[57] ABSTRACT

A control system for a multi-cylinder internal combustion engine comprises a split engine control unit for operating the engine on partial cylinders when reduced engine power can adequately operate the vehicle, and first and second upstream exhaust conduits for directing exhaust gases from first and second group cylinders respectively to a common junction to which a downstream exhaust conduit is connected for emitting the gases to the atmosphere. A first set of an exhaust gas sensor and catalytic converter is disposed in the first conduit to be exposed to the stream of gases exhausted from the second group cylinders which are activated at all times and a second set of an exhaust gas sensor and catalytic converter is disposed in the common downstream conduit to be exposed to the stream of gases exhausted from the first group cylinders directed through the first conduit and to the gases passed through the upstream catalytic converter in the second conduit. A feedback control circuit is responsive selectively to a signal from the first gas sensor during the partial cylinder operation for correcting the mixture ratio to a rich side of stoichiometry to promote reduction of the NOx component in the upstream converter and oxidation of HC and CO components in the downstream converter, and to a signal from the second gas sensor during the full cylinder operation for correcting the mixture ratio to a point at or near stoichiometry to promote simultaneous reduction and oxidation processes in both of the converters.

4 Claims, 5 Drawing Figures

4,274,373

COMBINED SPLIT ENGINE AND CLOSED LOOP MIXTURE CONTROL OPERATION WITH ENRICHED FUEL DURING PARTIAL CYLINDER MODE

BACKGROUND OF THE INVENTION

The present invention relates to control systems for multiple cylinder internal combustion engines, and in particular to a control system which combines closed-loop mixture control and split engine operations.

It is known that fuel economy is achieved under light load conditions by operating a multiple cylinder engine on partial cylinders if the reduced engine power can adequately operate the vehicle. When the engine load is relatively heavy the engine is operated on full cylinders. The whole cylinders are thus divided into a first group which is deactivated at light loads and a second group which is operated at all times. This method of engine control is known as split engine operation. On the other hand, closed-loop mixture control systems are also known and widely used as an effective means of eliminating noxious gaseous components. Such systems employ an exhaust gas sensor and a three-way catalytic converter disposed downstream of the gas sensor to effect simultaneous oxidation of hydrocarbon and monoxide and reduction of nitrogen oxides when the air-fuel ratio is precisely controlled to within a narrow range, known as conversion efficiency window near stoichiometry.

However, the above known methods cannot be combined together without giving rise to a problem in that the deactivated cylinders under light load act as an air pump to introduce air into the exhaust system thereby increasing oxygen contents therein, which results in a false gas sensor signal. To prevent this problem, a prior method involves the use of a shutoff valve to direct the stream of pumped air through a passage that bypasses the catalytic converter during partial cylinder mode, and switch the direction of the gas flow to the catalytic converter during the full cylinder mode.

However, because of the inherent delay time the exhaust gas takes to reach the location of the shuftoff valve, the signal that controls the shutoff valve must be precisely timed in relation to the delay time and if improperly timed a false gas sensor would result.

SUMMARY OF THE INVENTION

Accordingly, an object of the present invention is to provide a control system for a multi-cylinder internal combustion engine which effects reduction of noxious gas components during transient periods when the engine operation is a switched between full and partial cylinder modes.

The present invention contemplates the use of first and second upstream exhaust passages for directing gases exhausted from first and second cylinders of the engine respectively to a common joint to which a common downstream exhaust passage is connected for directing exhaust gases to the atmosphere, and the use of a first exhaust gas sensor and an upstream catalytic converter disposed in the second upstream exhaust passage, and a second exhaust gas sensor and a downstream catalytic converter both disposed in the common downstream exhaust passage. A split engine control circuit is provided to effect full cylinder engine operation in which both first and second cylinders are activated when the engine load is above a predetermined value and effect partial cylinder operation in which only the second cylinder is activated when the load is below the predetermined value and air is pumped from the deactivated first cylinder into the first upstream exhaust passage. A feedback control circuit is selectively responsive to a signal from the first exhaust gas sensor during the partial cylinder operation to provide mixture enrichment control and responsive to a signal from the second exhaust gas sensor during the full cylinder operation to provide stoichimetric mixture control. Because of the enrichment of the supplied mixture the NOx component of the burnt gases emitted from the second cylinder during the partial cylinder mode is purified in the upstream converter at a maximum conversion efficiency, while the HC and CO components thereof are partially purified in the same converter and them mixed in the common exhaust passage with the air pumped from the deactivated first cylinder to increase their oxygen contents, so that oxidation of the HC and CO components is promoted in the downstream converter disposed in the common exhaust passage. During the full cylinder mode simultaneous reduction of NOx and oxidation of HC and CO components of the burnt gases from all the cylinders are effected in the upstream and downstream converters since the entering gases are maintained at the stoichometric point.

Another object of the invention is therefore to provide a combined split engine and feedback control operation in which the noxious emission components are converted into harmless waste products at the maximum efficiency during the partial and full cylinder operational modes.

BRIEF DESCRIPTION OF THE INVENTION

The invention will be further described by way of example with reference to the accompanying drawings, in which.

DETAILED DESCRIPTION

Figure 1:
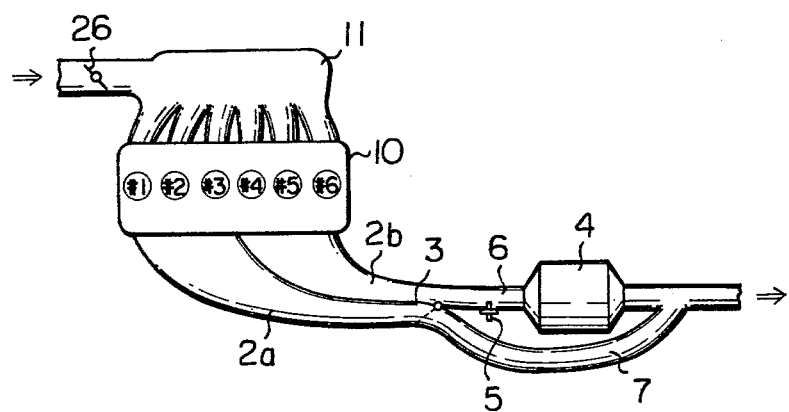
FIG. 1 is a schematic diagrammatic view illustrating the prior art arrangement.

Before describing the present invention reference is first made to FIG. 1 in which the prior art closed-loop mixture controlled split engine operating system is schematically illustrated. In FIG. 1, the first group cylinders No. 1 to No. 3 of the engine 10, which are deactivated under light load conditions, communicate through an exhaust conduit 2a and a conduit 7 to the atmosphere, while the second group cylinders No. 4 to No. 6, which are activated at all times, communicate through conduit 2b and a common passage 6 to a three-way catalytic converter 4 and thence to the atmosphere.

In the common conduit 6 is provided an exhaust gas sensor 5 to generate a gas sensor output signal for feedback control purposes. A selector valve 3 is provided between the conduits 2a and 2b to assume a position indicated by broken lines to direct the exhaust gases from the first group cylinders to the common conduit 6 during full cylinder mode of operation and operate to assume a second position indicated by a solid line to allow the air pumped from the deactivated cylinders to pass through the conduit 7 which bypasses the gas sensor 5 and catalytic converter 4 when the engine is operated on partial cylinders.

If the selector valve 3 is activated at a point in time which is earlier than the time at which the engine operation is switched from partial to full cylinder modes, a certain amount of residual air from the previously deactivated cylinders tends to mix with the exhaust gases from the activating cylinders in the common conduit 6, whereby the gas sensor 5 will generate a signal which is an indication that an excessive amount of air is present in the exhaust gases. This results in an excessively enriched mixture and a decrease in efficiency for reducing the NOx components. Conversely, if the valve switching is delayed from the time the operational mode is switched from partial to full cylinders, the burnt gases exhausted from the first group cylinders are allowed to bypass the catalytic converter 4. Similar undesirable consequences tend to occur when the mode is switched from full to partical cylinders.

Figure 2:
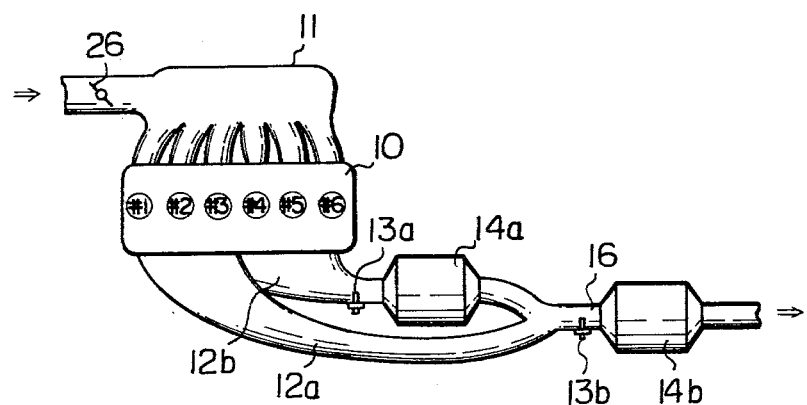
FIG. 2 is a schematic diagrammatic view showing an arrangement according to the invention.

In FIG. 2 the engine control system of the invention is shown as comprising a first upstream exhaust conduit 12a connected to the first group cylinders No. 1 to No. 3 for leading the exhaust gases therefrom to a common downstream exhaust conduit 16 and a second upstream exhaust conduit 12b connected to the second group cylinders No. 4 to No. 6 for leading the exhaust gases therefrom to the common passage 16 through a first three-way catalytic converter 14a. A first exhaust gas sensor or oxygen sensor 13a is mounted in the conduit 12b upstream of catalytic converter 14a and a second passage 16 also upstream of the catalytic converter 14b.

During partial cylinder mode the output signal from the gas sensor 13a is utilized for feedback control operation and during full cylinder mode the output signal from the gas sensor 13b is utilized for feedback operation.

Figure 3:
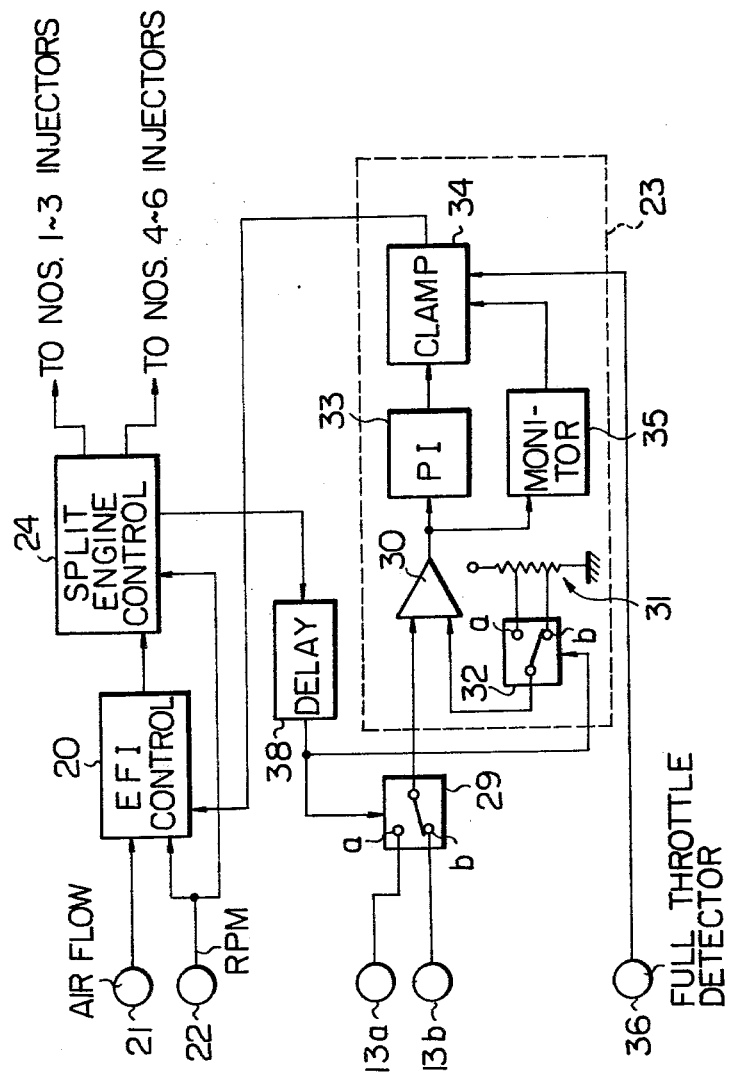
FIG. 3 is a circuit diagram associated with the arrangement of FIG. 2.
Figure 4:
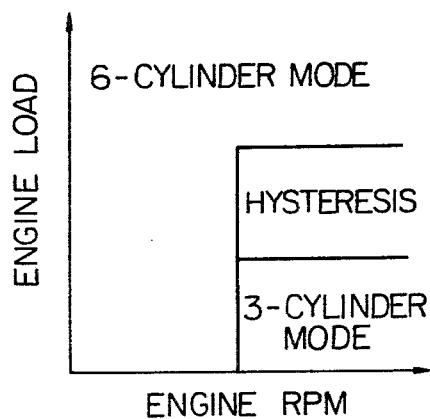
FIG. 4 is an explanatory graphic diagram of the split engine control circuit of FIG. 3.

FIG. 3 is an illustration of the control circuit of the invention. An electronic fuel injection control unit 20 takes its inputs from an intake air flow sensor 21 and from an engine speed sensor 22 and computs on these input data to obtain an air quantity taken in per engine crankshaft revolution and derives an injection pulse with a length proportional to the computed air quantity that represents the engine output power or load. The injection pulse is supplied in synchronism with crankshaft revolution to a split engine control circuit 24 and thence to the first group cylinders No. 1 to No. 3 and also to the second group cylinders No. 4 to No. 6. The split engine control circuit 24 is also responsive to signals from the engine speed sensor 22. The split engine control circuit 24 includes means responsive to the pulse length of the injection pulse to detect the magnitude of engine load to operate a partial cylinder mode command signal when the detected engine load is below a preselected value depending on the engine speed value and the throttle position as illustrated in FIG. 4. In FIG. 4, if the engine speed is below the preselected value, the split control circuit 24 generates a full cylinder command signal to permit the engine to operate on full cylinders regardless of the engine load.

During the full cylinder mode, injection control pulses are supplied to all the fuel injectors No. 1 to No. 6, and during the partial cylinder mode the injection pulses to the No. 1 to No. 3 are disabled.

To prevent the split engine control system to repeatedly switch between partial and full cylinder modes as the detected engine load crosses the preselected value due to insignificant variations of engine load, the circuit 24 is also provided with means for providing a hysteresis action which permits the system to maintain the previous operational mode as the mode has been changed even though the engine load varies immediately after the mode switching event (FIG. 4).

The partial cylinder command signal provided by the split engine control circuit 24 is supplied through a delay circuit 38 to a changeover switch 29. This switch has a first stationary contact "a" connected to the gas sensor 13a and a second stationary contact "b" connected to the gas sensor 13b and a moving contact arm normally connected to the contact "b" in the absence of a partial-cylinder command signal from the delay circuit 38. In the presence of the partial cylinder command signal from the delay circuit 38, the switch 29 is operated to move its contact arm to the position "a."

Figure 5:
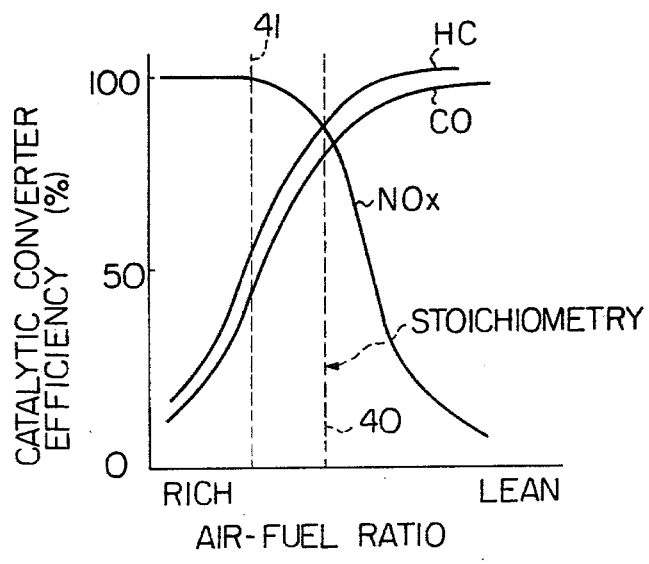
FIG. 5 is a graphic representation of the conversion efficiency of a three-way catalytic as a function of air-fuel ratio, useful for describing the partial cylinder engine operation.

A feedback control circuit 23 is provided which includes a comparator 30 having a first input terminal connected to the moving contact arm of the switch 29 for making a comparison with a reference voltage supplied from a source 31 through a changeover switch 32. The switch 32 is normally in the "b" contact position to feed a low reference voltage to a second input terminal of the comparator 30. This low reference voltage corresponds to the stoichiometric mixture ratio as indicated by broken lines 40 in FIG. 5. During the full cylinder operation the switches 29 and 32 remain in the "b" positions and the comparator 30 provides an output signal when the gas sensor signal from 13b is above the low reference voltage and supplied its output to a proportional/integral controller 33 and through a clamping circuit 34 to the fuel injection control circuit 20 for purposes of correcting the pulse length of the injection pulses so that the air-fuel ratio of mixture supplied to all the cylinders is controlled to the stoichiometric point. The upstream converter 14a is effective to promote simultaneous reduction of NOx and oxidation of HC and CO emitted from the cylinders No. 4 to No. 6, while the downstream converter 14b is effective to promote the simultaneous reduction and oxidation processes with respect to the gases emitted from the cylinders No. 1 to No. 3.

During the partial cylinder mode, the partial command signal from the split engine control circuit 24 is supplied to the switches 29 and 32 to cause their contact arms to switch to the "a" positions so that the comparator 30 is in receipt of a signal from the gas sensor 13a for making a comparison with a high reference voltage supplied from the source 31. This high reference voltage corresponds to a rich mixture ratio as indicated by broken lines 41 and in FIG. 5. The feedback control point is thus switched to a rich side of the stoichiometry and the mixture supplied to the activated cylinders No. 4 to No. 6 is enriched. During this mode the NOx component of the gases from the cylinders No. 4 to No. 6 is purified at a maximum conversion efficiency in the upstream converter 14a, while the HC and CO components of the gases from these cylinders are partially purified in the upstream converter 14a and then mixed with air pumped through the deactivated cylinders No. 1 to No. 3. As a result, the HC and CO components of the gases entering the downstream converter 14b are oxidized at high efficiencies. The feedback control circuit 23 further includes a monitor circuit 35 which serves to detect when the gas sensor output level remains low during low temperature periods such as cold engine start and signals the clamping circuit 34 to cause it to clamp the control signal from the PI controller 33 at a constant or disabled level so as to suspend closed loop mixture control operation. The clamping circuit 34 also receives a signal from a full throttle detector 36 which permits it to occur when the throttle valve 26 is fully open for maximum acceleration and this clamps the control signal to allow the engine to give a maximum output power.

When the engine load reduces below a preset level, the split engine control circuit 24 detects it by sensing the pulse length of the injection pulse becoming smaller than a threshold and provides a high voltage, partial cylinder mode command signal to the delay circuit 38 which introduces a delay interval. This delaying action has the effect of allowing the possible slight difference in gas concentration between the first and second group cylinders to reduce to a minimum. If such concentration difference does not exist, the delay interval would be unnecessary since the gases exhausted from the previously activated cylinders No. 1 to No. 3 would produce no harmful effect on the active gas sensor 13a even if the changeover switch 29 is switched to the "a" position simultaneously in response to the partial cylinder mode command signal.

At heavy engine load the control circuit 24 provides a low voltage, full cylinder mode command signal which is delayed by 38 for a time period sufficient to allow the residual air in the first upstream conduit 12a to be completely exhausted through conduit 16 and allow the exhaust gases from the now activated first group cylinders No. 1 to No. 3 to reach the gas sensor 13b. If without this delay interval, the residual air in conduit 12a would increase the oxygen content to cause the gas sensor 13b to produce a false output signal.

The rich burn operation of the engine during the partial cylinder mode thus promotes oxidation of the HC and CO components in the downstream side catalytic converter 14b. This serves to operate the downstream converter in the activated state during the partial cylinder mode and keeps it at high temperature conditions, with the result that when the mode is switched from the partial to full cylinders the downstream converter is capable of immediately providing simultaneous reduction and oxidation reactions. If during the partial cylinder mode the upstream converter 14a is fully activated to provide the simultaneous reaction process, the downstream converter 14b would be left inactivated with the result that its temperature will go low if the partial mode is continued for an extended period of time, causing it to be ineffective when the mode is switched from the partial to full cylinder operations. The present invention successfully avoids this problem by the rich burn engine operation.

What is claimed is:

1. A control system for an internal combustion engine having first and second cylinder groupings, comprising split engine control means for operating said engine on full cylinders in which said first and second cylinder groupings are activated to give higher engine power when the magnitude of engine load is above a predetermined value or operating said engine on partial cylinder in which only said second cylinder grouping is activated to give lower engine power when the engine load magnitude is below said predetermined value and said first cylinder is deactivated to allow air to be pumped therethrough;

first and second upstream exhaust conduits for passing the exhaust gases from said first and second cylinder groupings when the engine is operated on full cylinders, respectively, to a common junction and for passing the pumped air from said first cylinder grouping and the exhaust gases from said second cylinder grouping to said common junction when the engine is operated on partial cylinder;

a common downstream exhaust conduit connected to said common junction for passing said gases therethrough to the atmosphere;

a first exhaust gas sensor and a first catalytic converter disposed in said second exhaust conduit;

a second exhaust gas sensor and a second catalytic converter disposed in said common conduit; and feedback means selectively responsive to a signal from said first exhaust gas sensor during the partial cylinder engine operation for correcting the air-fuel ratio of mixture supplied to said second cylinder grouping to the rich side of stoichiometric point, and responsive to a signal from said second exhaust gas sensor during the full cylinder engine operation for correcting the air-fuel ratio of mixture supplied to both said first and second cylinder groupings to said stoichiometric point, whereby during said partial cylinder engine operation the NOx component of the gases from said second cylinder grouping is purified in said first catalytic converter at a maximum conversion efficiency and the HC and CO components thereof are mixed with said pumped air and purified in said second catalytic converter at a maximum conversion efficiency, and during the full cylinder engine operation the NOx, HC and CO components of the gases from said first and second cylinder groupings are purified simultaneously in said second and first catalytic converters, respectively.

2. A closed loop mixture control system as claimed in claim 1, wherein said feedback control means comprises a comparator having a first input terminal selectively responsive to a signal from said first gas sensor during the partial cylinder engine operation and to a signal from said second gas sensor during the full cylinder engine operation and a second input terminal selectively responsive to a first reference voltage corresponding to a rich air-fuel mixture ratio during the partial cylinder engine operation and to a second reference voltage corresponding to the stoichiometric air-fuel ratio during the full cylinder engine operation, for generating a comparator output signal at one of two discrete values depending on whether the signal at said first input terminal is above or below the voltage at said second input terminal for correcting the air-fuel ratio of mixture supplied to said engine.

3. A control system as claimed in claim 1, further comprising delay interval introducing means responsive to the initiation of the full cylinder engine operation for introducing a delay interval sufficient to allow gases in said first exhaust conduit to be exhausted through said common conduit to the atmosphere to permit said feedback control means to respond to the signal from said second exhaust gas sensor at the termination of said delay interval.

4. A control system as claimed in claim 1 or 2, further comprising delay interval introducing means responsive to the initiation of the partial cylinder engine operation for introducing a delay interval to permit said feedback control means to respond to the signal from said first exhaust gas sensor at the termination of the last-mentioned delay interval.

* * * * *